United States Patent [19]

Komine et al.

[11] E Re. 29,884

[45] Reissued Jan. 16, 1979

[54] KEY TELEPHONE SYSTEM FOR SUBSCRIBERS

[75] Inventors: Shigeharu Komine; Yoshiaki Tanaka; Shiro Kuzuya, all of Tokyo, Japan

[73] Assignee: Oki Electric Industry Company, Ltd., Tokyo, Japan

[21] Appl. No.: 882,104

[22] Filed: Feb. 28, 1978

Related U.S. Patent Documents

Reissue of:

[64] Patent No.: 3,985,959
Issued: Oct. 12, 1976
Appl. No.: 618,122
Filed: Sep. 30, 1975

[30] Foreign Application Priority Data

Oct. 5, 1974 [JP] Japan ..... 49-114305

[51] Int. Cl.[2] ..... H04M 11/06; H04M 1/00

[52] U.S. Cl. ..... 179/2 DP; 179/18 AD; 179/99

[58] Field of Search ..... 179/2 DP, 18 AD, 99

[56] References Cited

U.S. PATENT DOCUMENTS 3,519,757 7/1970 Anderson et al. ..... 179/18

*Primary Examiner*—George G. Stellar
*Attorney, Agent, or Firm*—Paul & Paul

[57] ABSTRACT

A key telephone system for subscribers is disclosed which includes at least a plurality of key telephone stations, a subscriber common equipment which connects the key telephone stations to each other and further connects the key telephone stations and an private automatic branch exchange, wherein said subscriber common equipment comprises switching network circuits, a register connecting circuit, line circuits, intra-office circuits, line circuit links, intra-office circuit links and a common controller, whereby each of said key telephone stations is connected to the subscriber common equipment through a pair of speech lines and a few control lines, and further said key telephone station can handle data processing services through said control lines by using a data terminal equipment attached to the key telephone station and a data processing unit by way of said subscriber common equipment.

2 Claims, 13 Drawing Figures

LC
LC
LC
IC
IC
IC
SNCo
STo
BUCo
CN8
CN4
CN1
CNWo
SNC1
ST1
BUC1
CN7
CN6
CNW1
SNCn
STn
BUCn
CNWn
RGC
CN9
CN5
CN2
CNW
PB
X
LCLo
LCL1
LCLn
ICLo
ICL1
ICLn
RLo
RL1
BL
RL
CC
CN3
PB
DT
PBOSC
BT
RT

KEY TELEPHONE SYSTEM FOR SUBSCRIBERS

Matter enclosed in heavy brackets [ ] appears in the original patent but forms no part of this reissue specification; matter printed in italics indicates the additions made by reissue.

The present invention relates to a key telephone system for subscribers.

Recent private automatic branch exchange systems include a wide variety of numerous new services which are operated by subscribers; for instance, transfer, call-back, pick-up, camp-on, add-on, holding, conference telephone, call-waiting, paging, abbreviated dialing, call-advance in case a called subscriber is absent, don't-disturb, or message services. Further, in an automatic exchange system which is controlled by using a stored program, the multiplication of functions in a terminal device is greatly advanced, and thereby in resent years the necessity to carry out many of the aforesaid services is remarkably increasing.

As mentioned above, the automatic exchange system has made great advances, and various new kinds of services have been introduced therein. However, most of the telephone stations which are currently used, are still old-fashioned. Only a service button (gland button) for demanding services, if anything, is used in a limited number of telephone stations of subscribers, where the demand and release of the aforesaid new services are effected, in most cases, by the operation of a handset or by dialing a special number. Accordingly, complicated operations are required for subscribers who utilize the new services using conventional telephone stations and, hence, such new services are very difficult to utilized.

Consequently, in recently years, there is a remarkably strong demand not for the aforesaid conventional telephone stations but for the key telephone stations. One of the factors behind this may be the easiness of operation of the key telephone stations, when compared to the operation of the aforesaid conventional telephone stations. The key telephone system is often used in such a manner that it is incorporated into extensions in the form of a number of relatively small key telephone systems mounted in a private automatic branch exchange.

However, if one tries to utilize the aforesaid many services by using a conventional key telephone system, each key telephone station is required to have many connections to various lines; such as a plurality of telephone line circuits, a plurality of control wires of the flicker lamps for indicating the condition of the each telephone line circuit, a plurality of control wires for various service functions, power source lines for providing electric power to the electronic circuits mounted in the key telephone station, and so on. For instance, in a key telephone system having 20 central office lines, each key telephone station of the key telephone system will be required to have thirty buttons and a few hundred lead wires and, as a result, such a key telephone station will become as large as an attendant board; in addition, the operation of the key telephone station will become too complicated when it is used practically. Since the key telephone station would have 30 buttons and a few hundred lead wires, it is very difficult to expand the capacity of the line circuit and it is very costly, and takes considerable time to maintain the key telephone system further, there is an excessive complexity in lead wire connections.

It is a principal object of the present invention to provide a unique key telephone system in which each key telephone station can deal with all of the aforesaid new services without increasing the number of buttons and lead wires which would be increased when the conventional key telephone station is used. Furthermore, the key telephone system of the present invention can deal with not only the aforesaid new services but, also, data processing services without interrupting the operation of the aforesaid new services.

The present invention will be more apparent from the ensuing description with reference to the accompanying drawings wherein.

Figure 1:
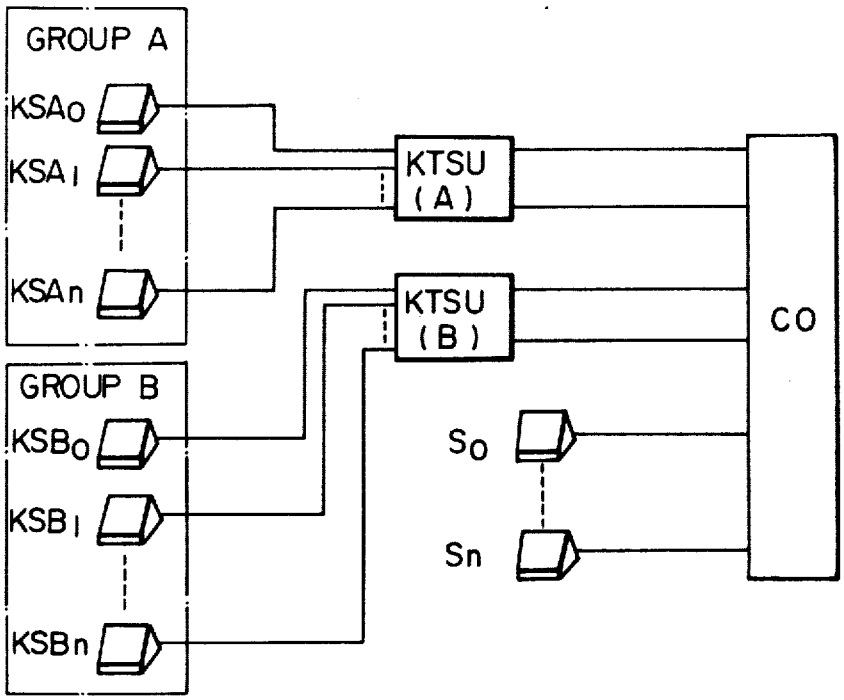
FIG. 1 is a block diagram showing an example of a conventional key telephone sytem.

FIG. 1 illustrates an example of conventional key telephone systems. In FIG. 1, KTSU represents a main unit of a conventional key telephone system, and $KSA_0$ through KSAn and $KSB_0$ through KSBn represent conventional key telephone stations each of which has buttons and lamps both of which connect to corresponding telephone line circuits. A plurality of telephone line circuits are connected to each of the key telephone stations in a multiple fashion. The selection of one of the plural telephone line circuits is carried out by using a button mounted thereon which corresponds the one of the plural telephone line circuits, and flicker lamps mounted on each of the key telephone staions indicate the telephone line circuit condition selectively, such as busy, held and called. In order to satisfactorily operate such a communication system as mentioned above, each key telephone station is required to have many connections to various lines; such as a plurality of telephone line circuits, a plurality of control wires of the flicker lamps for indicating the condition of the each line circuit, a plurality of control wires for various service functions, power source lines for providing electric power to the electronic circuits mounted in the key telephone station, and so on. As a result, a considerably large number of wires must be connected between each of the key telephone stations and the main unit. In FIG. 1, CO represents a central office or a private branch automatic exchange, and S represents a currently used telephone station.

At the present, due to continuing tecnical and sociological advances increases are required in the capacity of communication systems as well as availability of new kinds of services, easy installation and maintenance, and reduction of the size of the total equipment in use. However, with the conventional key telephone systems, any increase in capacity and any addition of service functions, result in a requirement for a great deal more line connecting buttons, service buttons and lead wires.

The present invention mitigates the aforesaid difficulty of the conventional technique in a key telephone system. With the key telephone system according to the present invention, the selection of the telephone line circuits is carried out by switching network circuits installed within a subscriber common equipment. The subscriber common equipment corresponds to the conventional main unit of a key telephone system (shown as KTSU in FIG. 1). That is, the key telephone station of the present invention does not have any buttons which connect to corresponding telephone line circuits, and said selection of the links, for example line circuit links, intra-office circuit links, register links, ringing tone link, and busy tone link, is effected by dialing. The dial information caused by dialing is delivered to the subscriber common equipment in a form of pulse signals through a control line connected between the key telephone station and the subscriber common equipment and, then, the subscriber common equipment counts the pulse signals and thereby selects the desired telephone line circuit. When the subscriber common equipment converts the dial information, that is the pulse signals, into a push-button signal (DTMF: dual tone multi-frequency address signal) which is a so-called PB signal, the PB signal is turned back to the key telephone station which is being operated. At the same time, when the desired line circuit is selected, the PB signal is also sent to the desired line circuit. Further, the key telephone station of the present invention is equipped with an intra-office originating button and an intra-office receiving button. In case a call is originated by pushing the intra-office originating button, an idle intra-office line circuit is automatically selected, and in case a call is received, a telephone line circuit is formed through an idle intra-office line circuit by pushing the intra-office receiving button. With the aforesaid arrangement, the buttons to be mounted on the key telephone station of the present invention become only dial buttons, an intra-office originating button, an intra-office receiving button, a holding button, and a few option buttons. Moreover, according to the present invention, the individual telephone station does not have any conventional push-button signal oscillator which is a so-called PB oscillator but, rather, a few PB oscillators are installed in the subscriber common equipment for common use by a number of key telephone stations. Thereby, the size of the key telephone station is reduced, the operation of the telephone station is improved. And further the conventional push-button signal receiver, which is a so-called PB receiver, is not required. The PB receiver has been necesary in a conventional key telephone exchange using a PB telephone station. Furthermore, the number of cables can be reduced to a few cables per key telephone station, and this allows simplification of the installation of the key telephone system and its maintenance. In addition, the present invention uses control lines between the key telephone station and the subscriber common equipment. The control lines are provided not only for transmission of the data necessary for processing at the telephone exchange, but also for transmission of the data used for operation of data processing, if necesary. The operation of data processing through said control lines will offer various kinds of new services to the subscribers who utilize the key telephone system according to the present invention.

The invention will now be described in detail by referring to the accompanying drawings. The overall key telephone system according to the present invention, is shown in FIG. 2, and details of various devices in the overall key telephone system are shown in FIG. 3 through FIG. 6 and FIG. 8 through FIG. 13.

Figure 2:
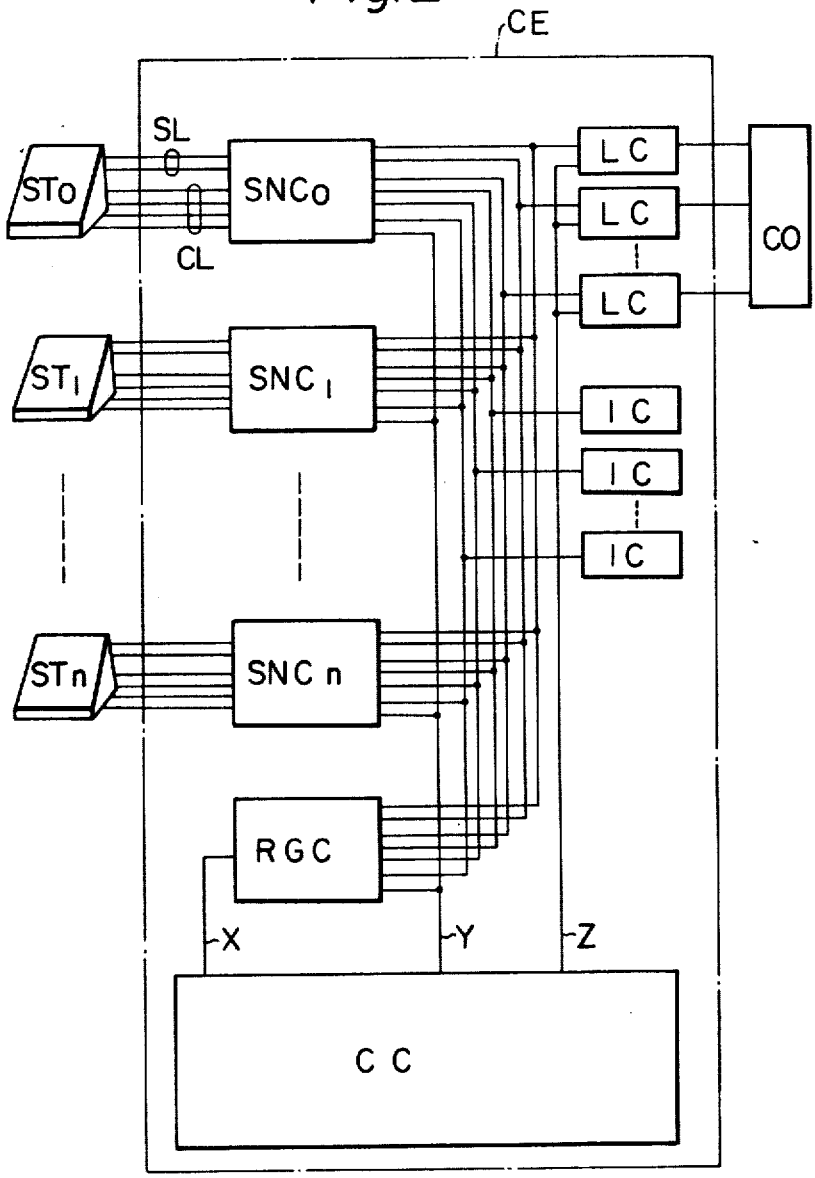
FIG. 2 is a block diagram of a key telephone system according to the present invention.
Figure 3:
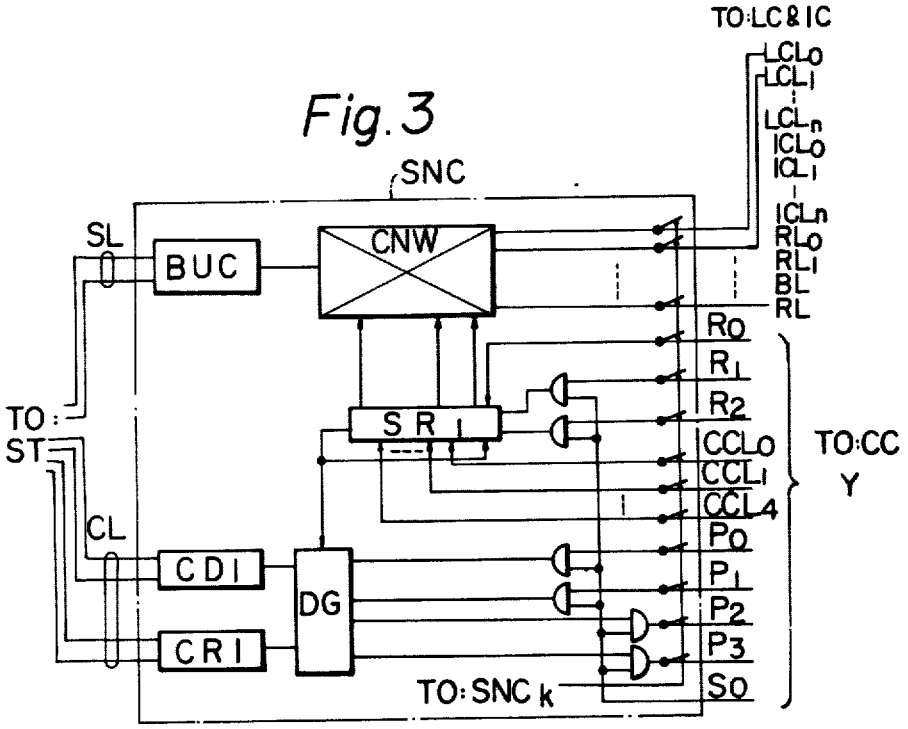
FIG. 3 is a block diagram of a switching network circuit.

Referring to FIG. 2, CE represents a subscriber common equipment which corresponds to the key telephone main unit of the prior art, shown as KTSU in FIG. 1. The subscriber common equipment CE, which is surrounded by a chain line, consists of the following devices. As shown in FIG, 2, one type of device is a switching network circuit SNC, of which there are a plurality. Each SNC is arranged to a corresponding key telephone station ST and is connected to the corresponding key telephone station ST through a few, for example four, control lines CL and two speech lines SL. The details of the switching network circuit SNC is shown in FIG. 3 surrounded by a chain line. As shown in FIG. 3, the switching network circuit SNC comprises: a shift register $SR_1$ which stores control information sent from a common controller CC shown in FIG. 2, where the control information indicates which telephone line circuit has to be selected among a plurality of telephone line circuits; a connecting network CNW which connects the selected telephone line circuit to a desired line circuit link or an intra-office line circuit link, based on the control information which is stored in the shift register $SR_1$; a balance-unbalance converter circuit BUC which converts a part of a speech-path circuit from a balanced circuit to an unbalanced circuit and, at the same time, provides a speech-carrying current to the telephone station ST; a data driver circuit $CD_1$ which sends lamp lighting information to the key telephone station ST; a data receiver circuit CR1 which receives lamp information for indicating the condition the telephone line circuit from the key telephone station, and; a data gate circuit DG which controls the lamp lighting information and the lamp information to be processed.

Figure 4:
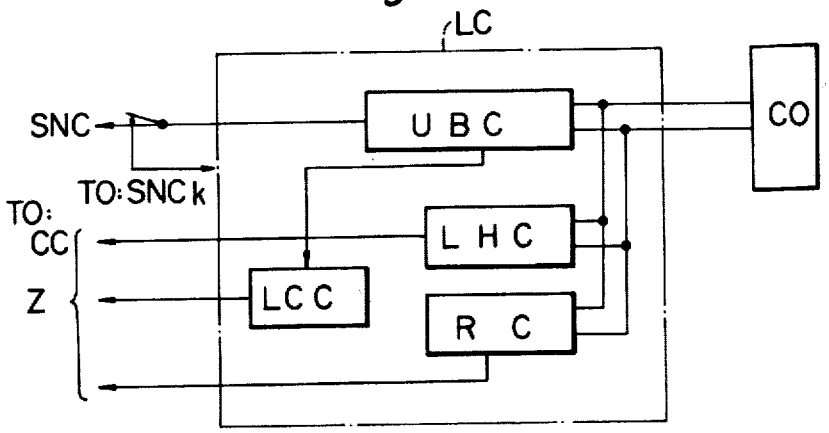
FIG. 4 is a block diagram of a line circuit.

The details of a line circuit LC of FIG. 2 are shown in FIG. 4 surrounded by a chain line. As shown in FIG. 4, the line circuit LC comprises: an unbalance-balance converter circuit UBC which converts the lines between the switching network circuit SNC and the key telephone station ST from an unbalanced circuit to a balanced circuit; a loop holding circuit LHC which forms a D.C. loop between the line circuit LC and the central office system or automatic exchange system CO when the line circuit LC is operating; a ringing detector circuit RC which detects ringing signals when the line circuit LC is called, and; a loop cut detector circuit LCC which detects a break of the D.C. loop on the lines between the line circuit LC and the central office system or automatic exchange system CO.

Figure 5:
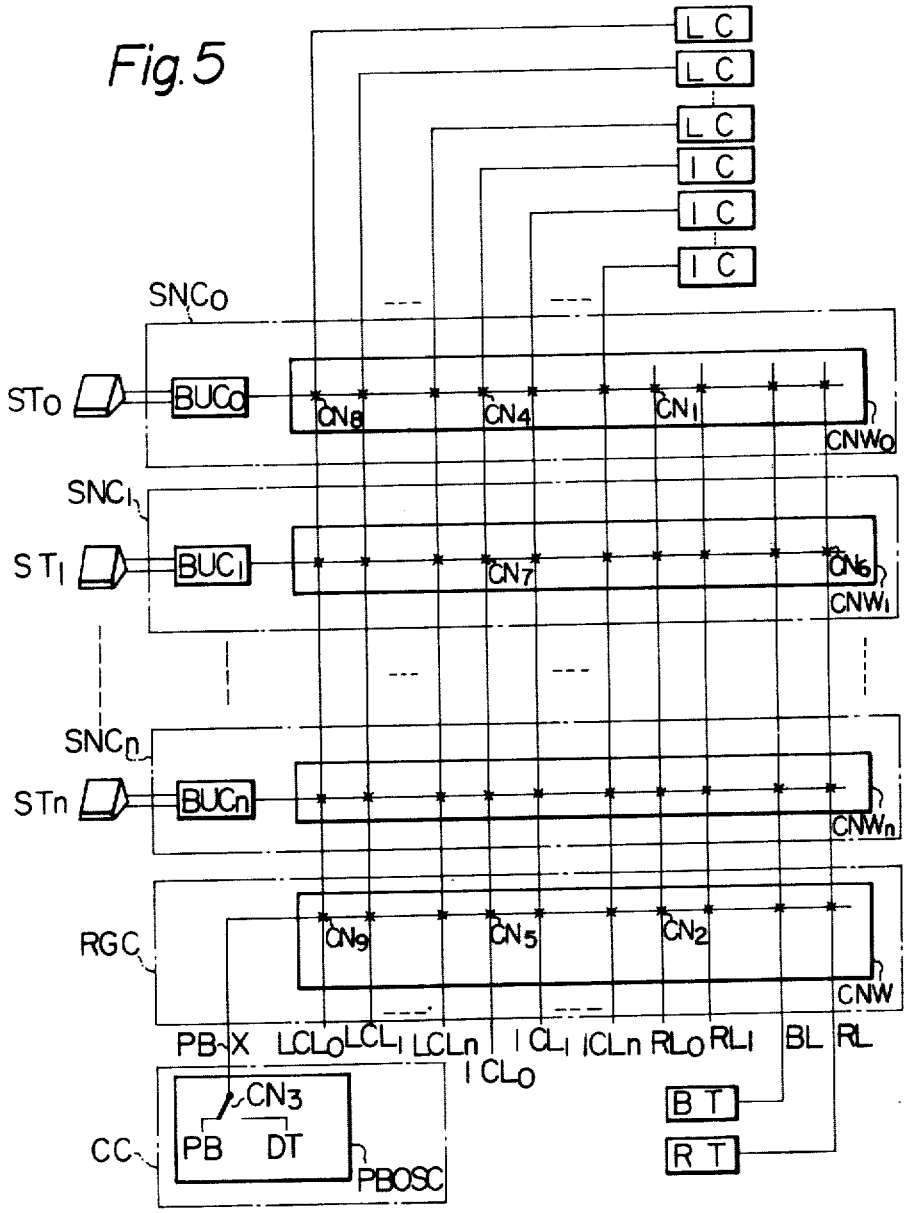
FIG. 5 is a schematic diagram showing the structural arrangement of a speech-path network according to the present invention.
Figure 6:
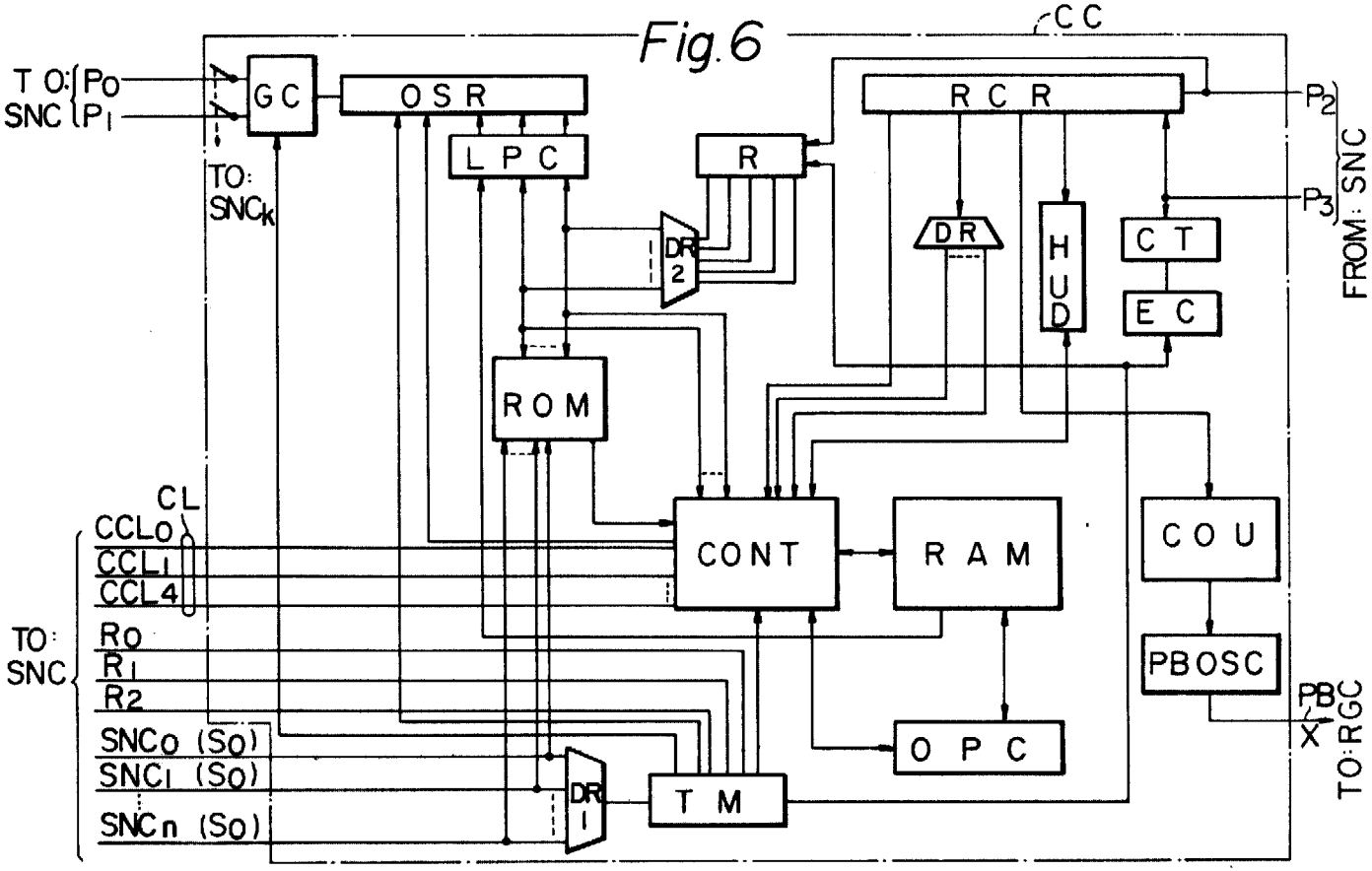
FIG. 6 is a block diagram of a common controller.

The details of a register connecting circuit RGC of FIG. 2 are also shown in FIG. 3. Referring again to FIG. 3, the register connecting circuit RGC comprises the shift register SR1 a connecting network CNW and the data gate circuit DG. The connecting network CNW is connected to a PB (push-button) oscillator PBOSC which is shown in FIG. 5. According to the present invention, all the dialing is effected by push-button, and the PB oscillator PBOSC is not disposed in the telephone station ST but in the common controller CC. The register connecting circuit RGC connects the PB oscillator PBOSC to one of the desired line circuit links $LCL_0$ through LCLn (shown in FIG. 5) or one of the desired intra-office circuit links $ICL_0$ through ICLN (shown in FIG. 5) to which the switching network circuit SNC of the originating key telephone station ST is connected. As a result, a PB signaling tone from the PB oscillator PBOSC is sent out to both the key telephone station ST and the central office CO, in response to the dial information sent from the key telephone station ST. Said dial information sent from the key telephone station ST is applied to the common controller CC through the control lines CL and information lines $P_2$ and $P_3$, as shown in FIGS. 3 and 6. As a result, the common controller CC drives the PB oscillator in accordance with the dial information.

A network of the speech-path portion according to the present invention will now be described by referring to FIG. 5. In FIG. 5, the telephone stations ST, the line circuits LC, the intra-office circuits IC, the switching network circuits SNC, the register connecting circuit RGC and the common controller CC, are the same as those of FIG. 2. Further, the connecting network circuit CNW and the balance-unbalance converter circuit BUC are the same as those of FIG. 3. Block RT represents a ringing tone transmitter and block BT represents a busy tone transmitter. As shown in FIG. 5, the key telephone stations ST and the PB oscillator PBOSC of the common controller CC are arranged along a horizontal line of a network, where the PB oscillator PBOSC provides a dial tone DT and PB signal tone PB, selectively by means of a switch $CN_3$. The line circuits LC, the intra-office circuits IC, the ringing tone transmitter RT and the busy tone transmitter BT are arranged along a vertical line of the network. Furthermore, the network includes a plurality of register links $RL_0$, $RL_1$ . . . which connect the PB oscillator PBOSC to the key telephone station ST. It should be noted that the network arrangement of the speech path portion is not restricted to that of FIG. 5, but various modifications are possible; for instance, the vertical connections and the horizontal connections of FIG. 5 can be interchanged. The switching arrangement of the network is not restricted to that of FIG. 5 either. The connecting operation of the network shown in FIG. 5, will be discussed hereinafter.

Figure 7:
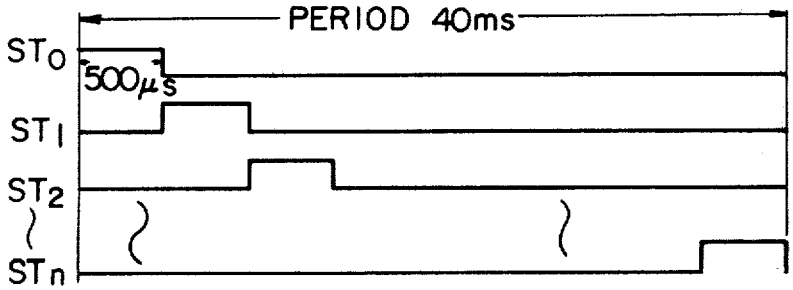
FIG. 7 is a graph showing an example of scanning time slots.

The common controller CC of FIG. 2 controls the successive interconnection of the line circuit LC, the switch network circuit SNC and the register connecting circuit RGC, in accordance with a series of programs. The details of the common controller CC will now be described by referring to FIG. 6. In FIG. 6, TM represents a timing signal generator which produces clock signals. The clock signals are applied to a decoder $DR_1$, so as to produce scanning signals which are directed to specifying one of the switching network circuits SNC sequentially. For instance, each of the scanning signals specifying the switching network circuit SNC has a period of 500 μs, as shown in FIG. 7; that is, the specified switching network circuit SNC cooperates with a corresponding key telephone station ST every period of 500 μs. Since eighty key telephone stations ST are arranged in the preferred embodiment of the present invention, a scanning period of 40 ms = 500 μs × 80) is allowed for scanning all the switching network circuits SNC. The scanning signals are applied to the switching network circuit SNC of FIG. 3 through the scanner lines so shown in FIGS. 3 and 6, respectively. The scanning signal on the scanner line SO, causes information to be applied to the specified switching network circuit SNC as an input thereof. Such information includes information to be applied to the shift register $SR_1$ (FIG. 3) from a clock signal line $R_1$ (FIGS. 3 and 6), a reset signal line $R_2$ (FIGS. 3 and 6), and control lines $CCL_0$ through $CCL_4$ (FIGS. 3 and 6). These control lines deliver information comprised of 5 bits, which indicate which link has to be selected among a plurality of links, $LCL_1$ through LCLn, $ICL_1$ through ICLn, $RL_0$, $RL_1$, BL and RL. In addition, said information further includes information which is sent to the key telephone station ST through the information lines $P_0$ and $P_1$ (FIGS. 3 and 6), that is lamp information. Also, said information includes information which is sent from the key telephone station ST through information lines $P_2$ and $P_3$ (FIGS. 3 and 6), that is the information originated by dial buttons, the intra-office originating button, intra-office receiving button, holding button, and so on. Said scanning signals on the scanner line SO cause the reading of a service class information with respect to each of the key telephone stations, from a service class information memory ROM (FIG. 6). Such service class information relates to the key telephone being scanned. The shift register $SR_1$ of FIG. 3 can handle input/output signals both in parallel and in series, and the stored information of the shift register $SR_1$ is transmitted to a receiving register RCR of FIG. 6 through the data gate circuit DG (FIG. 3) and the information line $P_3$ (FIGS. 3 and 6). It should be noted here that the information line $P_3$ carries not only th PB button information from the key telephone station ST through the data receiver circuit $CR_1$ and the data gate circuit DG but, also, the stored information of the shift register $SR_1$ through the data gate circuit DG. Thereafter, the stored information of the shift register $SR_1$ is applied once again into this shift register $SR_1$ in series. In the system according to the present invention, the time required for the above re-application of the stored information to the shift register $SR_1$ is relatively short, and during this short time the connecting network CNW which consists of conventional relays can not operate. Consequently, a buffer register is required at the input stage of shift resistor $SR_1$ to hold the stored information momentarily.

Referring still to FIG. 6, a register R stores information which indicates which line circuit links $LCL_0$ through LCLn or which intra-office circuit links $ICL_0$ through ICLn is occupied by the key telephone station ST being scanned. Based on the decoded information, by a decoder $DR_2$, from the register R, lamp flickering signals (i.e., called engaged, held) of each telephone line circuit are applied to a lamp lighting control circuit LPC, so as to prepare the line information to be sent to the key telephone station being processed. At the same time, other information for the key telephone station ST being processed is also prepared. This information includes a power source throw-in signal for an amplifier AMP (FIG. 8) of the key telephone station ST, status signals of intraoffice lines, and lamp information for option button lamps. The information thus prepared is applied to an outgoing sender register OSR and, then forwarded to a gate circuit GC by serial clocks. The gate circuit GC extracts both level 1 signals and level 0 signals as level 1 signals, and, then, sends the level 1 signals to the switching network circuit SNC through the information line $P_0$ in the form of level 1 signals and sends the level 0 signals to the switching network circuit SNC through the information line $P_1$ in the form of level 1 signals. The information both on the information lines $P_1$ and $P_0$, indicates the lamp information. The signals which are provided through the line $P_0$ (FIG. 3) and indicate the lamp information, are further delivered to the key telephone station ST by the data driver $CD_1$ of FIG. 3 through the control lines CL of FIG. 3, in the form of bipolar pulses having positive pulses and negative pulses.

The details of the key telephone station ST will now be described by referring to FIG. 8. The first bit of the data which are sent over the control line CL by way of a data receiver circuit $CR_2$, acts not only as a clock for applying various button information to a shift register $SR_2$ in parallel but, also, as a power throw-in signal for an amplifier AMP which drives a speaker SP to radiate a ringing tone. Said first bit is stored in a flip-flop F/F2, so as to hold the amplifier AMP active or non-active. The second and the succeeding bits of the aforesaid data which are sent over the control line CL by way of the data receiver circuit $CR_2$, are transferred into a shift register $SR_3$ as lamp information and, at the same time, such bits act as clock pulses for the shift register $SR_2$. The stored button information in the shift register $SR_2$, are converted into bipolar pulses by a data driver circuit $CD_2$. These bipolar pulses are transferred to the data receiver circuit $CR_1$ (FIG. 3) of the switching network circuit SNC through the control line CL. The signals sent from the data receiver circuit $CR_1$ (FIG. 3) are separated by the data gate circuit DG (FIG. 3) into level 1 signals and synchronizing signals. The separated level 1 signals are applied to the input terminal of the receiving register RCR (FIG. 6) through the information line $P_2$ (FIGS. 3 and 6), while the separated synchronizing signals are applied to the clock terminal of said receiving register RCR through the information line $P_3$ (FIGS. 3 and 6).

A pulse error check of the button information provided from the key telephone station is an important function for preventing erroneous operations. Although various methods have been used heretofore for checking pulse error of the button information, in the present invention the checking pulse error of the button information sent from the key telephone station ST is performed by counting the number of pulses of the button information, where the number of pulses of the button information is predetermined. The dispatching of the data from the key telephone station ST is clocked by each lamp information sent to the key telephone station ST and, accordingly, one bit of lamp information can be received by the station ST every time one bit of button information is sent out from the station ST, synchronous with the period of transmitting each lamp information, for example 500 μs in FIG. 7. Information error which would occur on the transmission lines is caused either by disappearance of the information or by disappearance of information where there is no actual information. In the present invention, since the level 1 pulse is represented by a positive pulse and the level 0 pulse is represented by a negative pulse, information error which is caused by a change of positive pulse to negative pulse and vice versa, can not occur. That is, the number of pulses of the button information which is sent from the key telephone station ST is counted by a counter CT (FIG. 6), and the error check is carried out by comparing the counted number of pulses of the button information and the predetermined number of pulses of the button information at an error check circuit EC (FIG. 6). The button information sent from the key telephone station ST is the ON-OFF information of the hook switch actuated by a handset H (FIG. 9), the function button information (the information relating to the intra-office originating button, the intra-office receiving button, or the holding button), the information relating to the option buton, or the information relating to the push-button dial (dial information). The hook switch information which indicates that the hook switch is actuated by the handset H (FIG. 9) and is held ON, is collated with the hook switch information which has been stored in a random access memory RAM (FIG. 6), by a hook up detector HUD (FIG. 6), so as to detect an originating call or the completion of a call. In this case, when an error is noticed by the information provided from the aforesaid error check circuit EC, priority is given to the information which has been stored in the memory RAM, so as not to effect any change in the preceding conditions. This is to prevent breakage of the line circuit during a conversation and two times or more detection of the same originating call.

Figure 9:
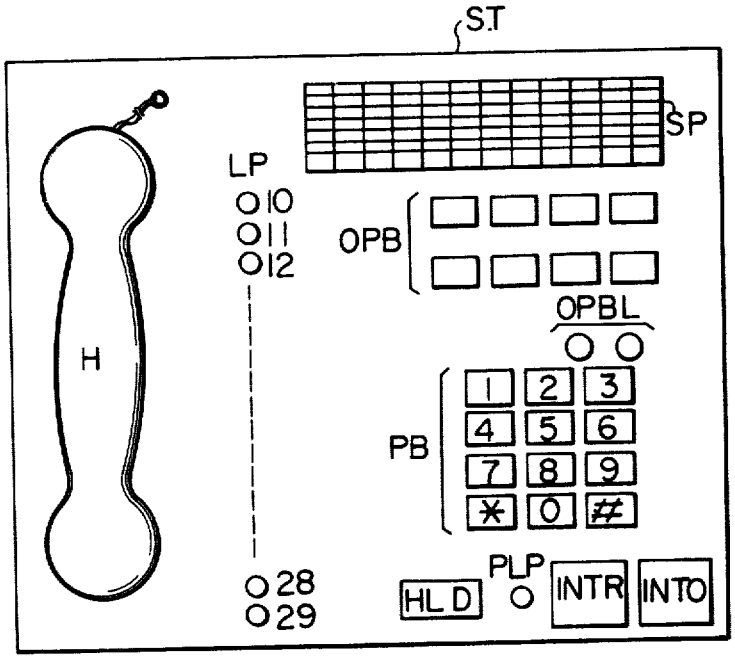
FIG. 9 is a diagrammatic illustration of the appearance of a key telephone station according to the present invention.

The appearance of a key telephone station ST according to the present invention will be now described by referring to FIG. 9. In FIG. 9: the symbol H represents a handset; PB represents push-button dials; SP represents a loud speaker which radiates a ringing tone; LP represents lamps displaying the condition, for example busy, idle, called or held, of each line circuit; PLP represents lamps displaying the condition, for example busy, idle called or held, of each intra-office circuit; OPB represents lamps displaying option buttons each of which provides the aforesaid various kinds of new services; OPBL represents two lamps, one of which indicates whether one of said option buttons is being operated (add-on) and another of which indicates whether a don't-disturb function is being operated; HLD represents a holding button; INTR represents an intra-office receiving button, and; INTO represents an intra-office originating button.

The operation of above-mentioned various kinds of buttons and the connections of these buttons to the electronic circuits, will now be described in a sequential fashion. When the handset H is raised, hook switch information representing such hook-up is written in the shift register $SR_2$ of FIG. 8. This hook switch information is then transferred to the data gate circuit DG of the switching network circuit SNC of FIG. 3 by the data driver circuit $CD_2$ (FIG. 8) through the data receiver circuit $CR_1$ (FIG. 3). The signals sent from the data receiver circuit $CR_1$ (FIG. 3), are separated by the data gate circuit DG (FIG. 3) into data signals and synchronizing signals. The separated data signals are applied to the input terminal of the receiver register RCR (FIG. 6) through the information line $P_2$ (FIGS. 3 and 6). The separated synchronizing signals are applied to the clock terminal of said receiving register RCR (FIG. 6) through the information line $P_3$. When application of the above-mentioned data signals and synchronizing signals to the receiving register RCR is completed, the hook up detector HUD compares the hook switch information thus received against the corresponding past information which has been stored in the memory RAM (FIG. 6), and; the origination of a call is detected by finding out the first appearance of the hook switch information in the receiving register RCR. A control circuit CONT (FIG. 6) selects an idle counter circuit COU (in FIG. 6 only one counter circuit COU is shown) and an idle register link (shown as $RL_0$, $RL_1$ . . . in FIG. 6). In order to connect the thus selected register link to both the switching network circuit SNC of FIG. 3 and the register connecting circuit RGC of FIG. 5, the information which commands this connection is sent out from the control circuit CONT of FIG. 6 in a form of a binary code through the control lines $CCL_0$ through $CCL_4$ (FIGS. 3 and 6) and, then, the information is stored in the shift register $SR_1$ (FIG. 3). The information thus sent and stored, acts to close corresponding switches in the connecting network CNW of FIG. 5. For instance, when the switches $CN_1$ and $CN_2$ are closed and the switch $CN_3$ is turned to the right, as seen in FIG. 5, then the dial tone DT is sent to the key telephone station $ST_0$ through the register link $RL_0$. When the dial tone DT is heard from the handset H of the key telephone station $ST_0$, the subscriber pushes the intra-office originating button, INTO of FIG. 9, when he wants an intra-office call. The information originated by the intra-office button INTO is applied to the shift register RCR of FIG. 6 in the same manner the aforesaid hook switch information is applied to the shift register RCR. The control circuit CONT selects an idle intra-office circuit IC in the same manner as the aforesaid selection of the register link. For instance, when the switches $CN_4$ and $CN_5$ of FIG. 5 are closed while the aforesaid switches $CN_1$ and $CN_2$ are opened, the idle intraoffice circuit is selected by way of the intra-office circuit link $ICL_0$ of FIG. 5. When the subscriber, who occupies the station $ST_0$ of FIG. 5, hears the dial tone DT, he knows that the station $ST_0$ is connected to one of the intra-office circuits which provide speech-carrying current and, then, he starts dialing a desired intra-office key telephone station number. Th counter circuit COU (FIG. 6) stores two digits of the dial information and, at the same time, this dial information drives the PB oscillator circuit PBOSC (FIG. 6), so as to return the PB oscillator signals to the originating subscriber. The number counted by the counter circuit COU (FIG. 6) is stored at the address in the memory RAM which corresponds to the proceeding intra-office circuit.

With regard to the connection to the called subscriber, when the called key telephone station finds its own number in the memory RAM, the telephone line circuit of the called key telephone station is connected to the ringing tone transmitter circuit RT (FIG. 5) through the line RL of FIG. 5, provided that the telephone line circuit of the called key telephone station is not busy. For instance in FIG. 5, a switch $CN_5$ is closed and the called subscriber key telephone station $ST_1$ is connected to the ringing tone transmitter circuit RT. AT the same time, both the information which indicates that the intra-office line is being called and the information which commands the throw-in of the amplifier power source are set in an outgoing sender register OSR of FIG. 6, so that such information is transferred from the gate circuit GC (FIG. 6) to the information lines $P_0$ and $P_1$ (FIGS. 3 and 6) connected to the switching network circuit SNW of FIG. 3. Then, the aforesaid information is converted into bipolar pulses by the data driver $CD_1$ of FIG. 3. The bipolar pulses thus converted are applied to the flip-flops F/F1 and F/F2 and the shift register $SR_3$ of the key telephone station ST through the data receiver circuit $CR_2$ thereof, as seen in FIG. 8. The flip-flop F/F2 throws in the power source to the amplifier AMP, so that the loud speaker radiates the ringing tone. Simultanously, the shift register SR3 of FIG. 8 flickers the intra-office receiving lamp of the called lamp PLP (FIG. 9), so as to indicate that an intra-office call is being made to the key telephone station ST. In response to the ringing tone, the called subscriber raises the handset H and hears the dial tone in the same manner as the aforesaid originating call. Then he pushes the intra-office receiving button, INTR of FIG. 9. When the information originated by the intra-office receiving button INTR is applied to the receiving register RCR of FIG. 6, the control circuit CONT of FIG. 6 searches, by using the memory RAM, the intra-office circuit IC which is used for the call of said called key telephone station. Then, the information relating to which intra-office circuit IC is used for the call of said called key telephone station, is applied to the shift register $SR_1$ of the switching network circuit SNC of FIG. 3. This information actuates a switch of that intra-office circuit link. For instance, a switch $CN_7$ of FIG. 5 is closed and then the calling party $ST_0$ and the called party $ST_1$ are connected through the intra-office circuit link $ICL_0$ by way of the switches $CN_4$ and $CN_7$, to allow conversation between these two parties. Thus, an intra-office speech path is obtained.

When the subscriber wants to originate a line circuit call or to receive a line circuit call, he first raises the handset H and at that time the handset H actuates the hook switch up, and then he makes sure that there is a dial tone. Then, he specifies the line circuit number, e.g., one of the two digits 10 through 29 of FIG. 9, by dialing the push buttons. After that, the counter circuit COU (FIG. 6) counts the pulse signals which are provided in accordance with the dial information and, as a result, the specified line circuit is connected to both the register connecting circuit RGC and the switching network circuit SNC, in the same manner as the aforesaid connection of the intra-office circuit. The dial tone disappears in response to the first digit of the dialing, and the PB signal tone, which is dialed by the subscriber, is transferred to him, for instance to his key telephone station $ST_0$ through the register link $RL_0$ of FIG. 5. Upon completion of dialing the two digits of the dialing, e.g., the digits 1 and 0 (shown as 10 in FIG. 9), the switches which have to be closed, are switched from the switches $CN_1$ and $CN_2$ to the switches $CN_8$ and $CN_9$, so that the connection to the private automatic branch exchange is accomplished through the line circuit link $LCL_0$. In the case of an originating a call, the key telephone station number of the called subscriber is dialed. Then, the PB oscillator circuit PBOSC of FIG. 6 sends out the PB signal tone according to the dialing to both the private automatic branch exchange and the key telephone station. In the case of receiving a line circuit call, the counter circuit COU (FIG. 6) is reset. Thus. the speech-path is completed for allowing conversation between the calling intra-office circuit party and the called line circuit party. An option circuit OPC, which is included in the common controller CC (FIG. 6), facilitates for instance abbreviated dialing, 3-digit long line restriction control, simultaneous paging, or the like.

The key telephone system can be provided not only for the usual communication of conversation based on the aforesaid new services, but also for data communication based on the data processing services. It should be noticed that the data communication is operated without interrupting the operation of the conversation communication. As can be seen from FIG. 7, in the present invention, a certain time-slot is given to each key telephone station $ST_0$, $ST_1$, $ST_2$ . . . STn, and each key telephone station is scanned for 500 μs every 40 ms, when n number of key telephone stations ($n \leqq 80$) are scanned, so as to exchange control data through control lines between the key telephone station and the subscriber central equipment CE. It should be noted that each control line CL of FIG. 2 is held idle except during the scanning period of 500 μs. Therefore, each control line CL being held idle can be utilized for data processing. Consequently, if a device for data exchange is installed at each key telephone station side and if a data processing unit is installed at the key telephone exchange side, it will become possible to exchange a relatively large amount of data between one device for data exchange and the other device for data exchange or between one device for data exchange and the data processing unit.

Figure 10:
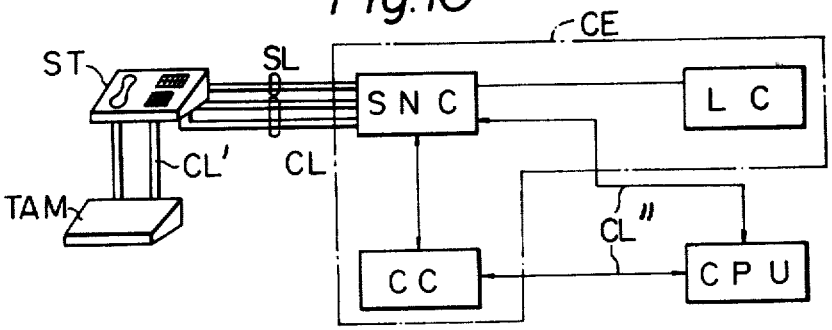
FIG. 10 is a block diagram showing a total view of a data exchange system according to the present invention.

An arrangement for fulfilling the aforesaid data processing will now be described by referring to FIGS. 10, 11, 12 and 13. In FIG. 10, the key telephone station ST, the switching network circuit SNC, the line circuit LC and the common controller CC, are the same as those shown in FIG. 2. Symbol TAM represents a data terminal equipment and CPU represents a central data processing unit.

In addition to the aforesaid 500 μs scanning timeslot, which is referred to as the first time-slot, for each of the key telephone stations ($ST_0$, $ST_1$ . . . STn), a second scanning time-slot is provided for each key telephone station. This second scanning time-slot is used for scanning the data terminal equipments, so as to enable the exchange of a large amount of data.

Figure 11:
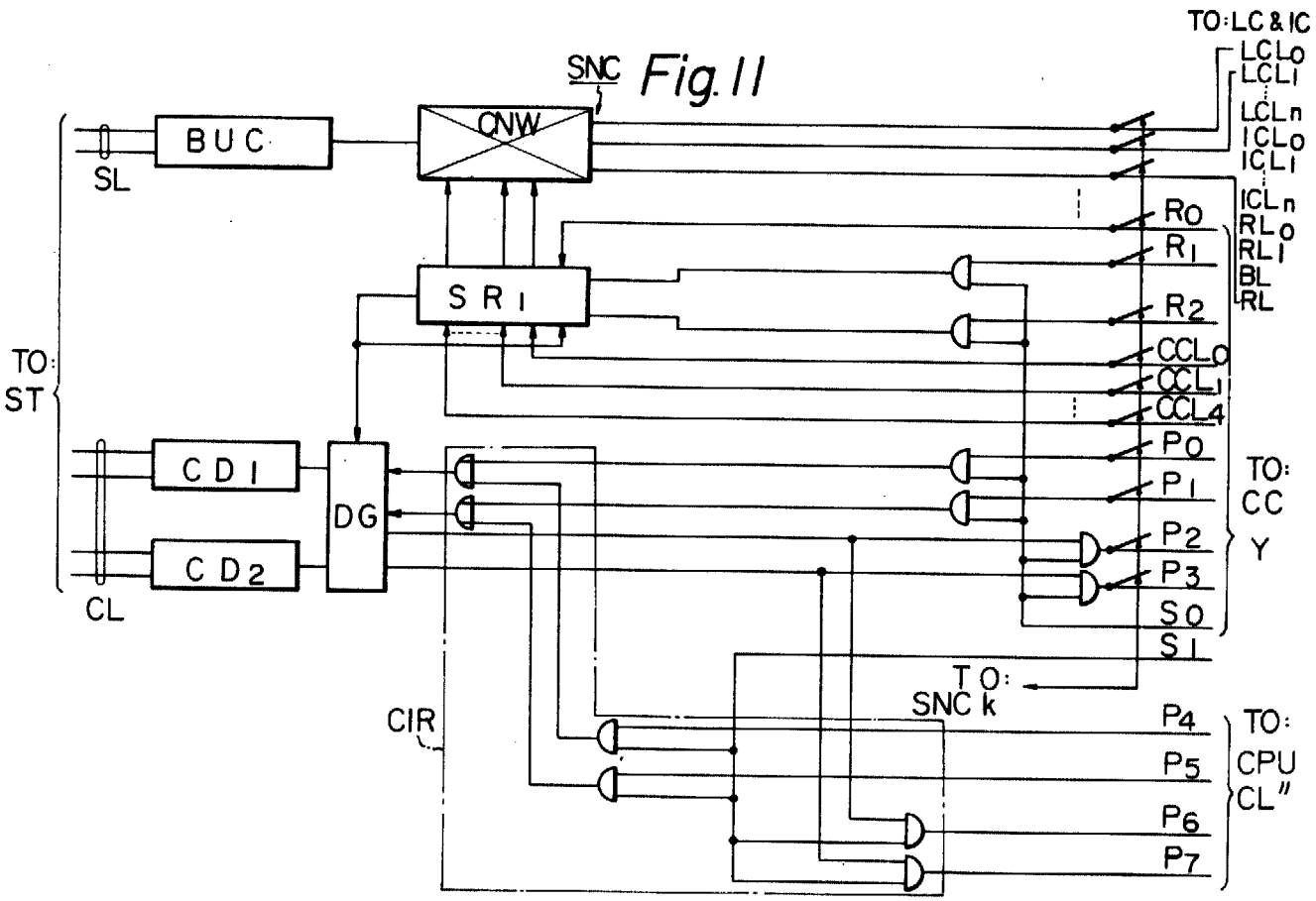
FIG. 11 is a block diagram showing the modified switching network circuit shown in FIG. 3 which further includes a part of the data exchange system, according to the present invention.
Figure 12:
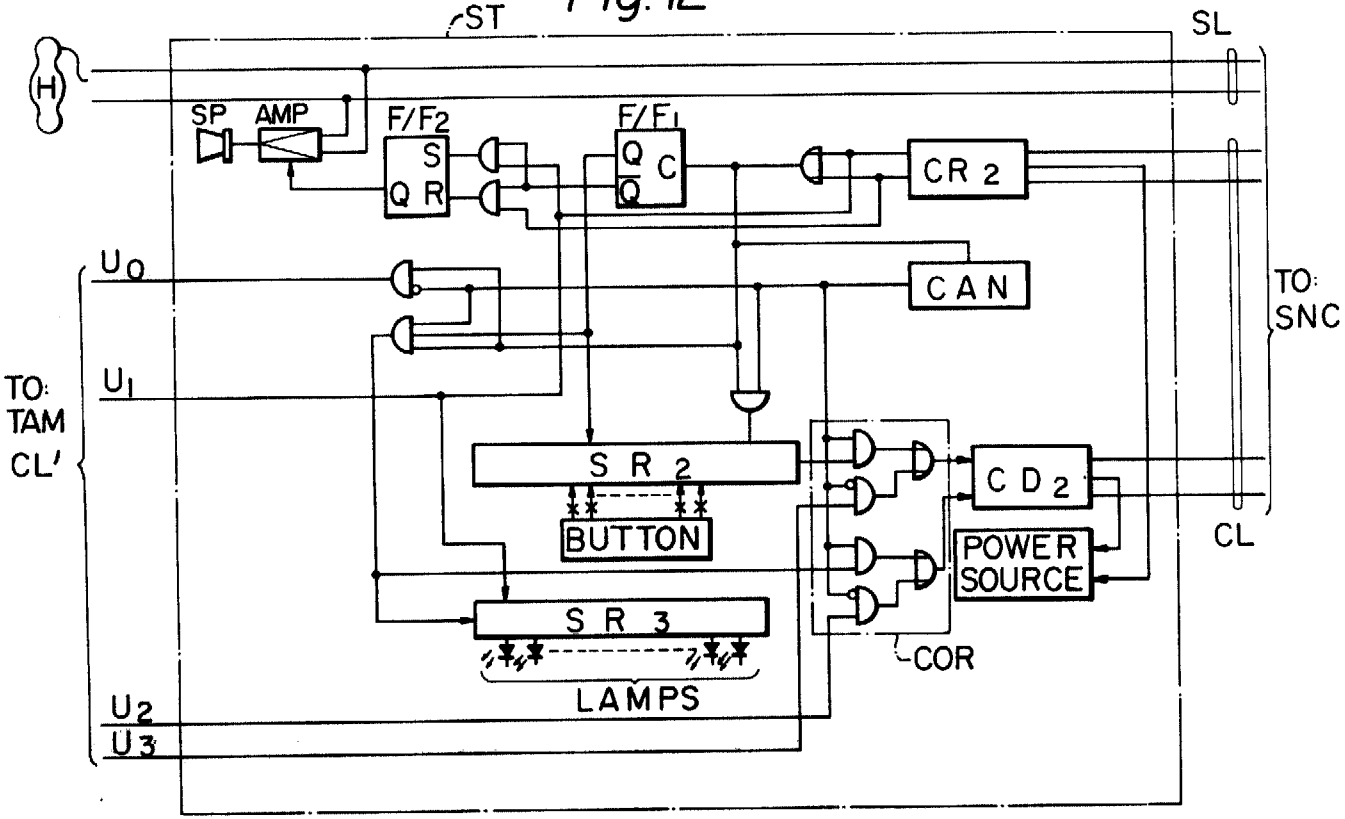
FIG. 12 is a block diagram showing the modified key telephone station shown in FIG. 8 which further includes a part of the data exchange system, according to the present invention.

FIGS. 11 and 12 illustrate details of the means for realizing the data exchange in the aforesaid second time-slot. FIG. 11 is a block diagram showing modification of the switching network circuit shown in FIG. 3, which further includes a part of the data exchange device. The data gate circuit DG, the data driver circuit $CD_1$, the data receiver circuit $CR_1$, the shift register $SR_1$, the balance-unbalance converter circuit BUC and the connecting network CNW of FIG. 11, are the same as those of FIG. 3. Symbol CIR which represents a portion surrounded by a chain line in FIG. 11, is a data isolator for separating first data which are handled in the first time-slot for the usual conversation communication, from second data which are handled in the second time-slot for the data communication. The data to be handled in the first timeslot are applied to the information lines $P_0$ and $P_1$, and the signal representing the first time slot is applied to the information line $S_0$. Status representing signals of the line circuit and the intra-office circuit necessary for the conversation communication, are delivered through the information lines $P_0$ and $P_1$ in the first time-slot. On the other hand, the signal representing the second time-slot is applied to the information line $S_1$, and the data necesary for data processing in the second time-slot, are applied through the information lines $P_4$ and $P_5$.

Figure 8:
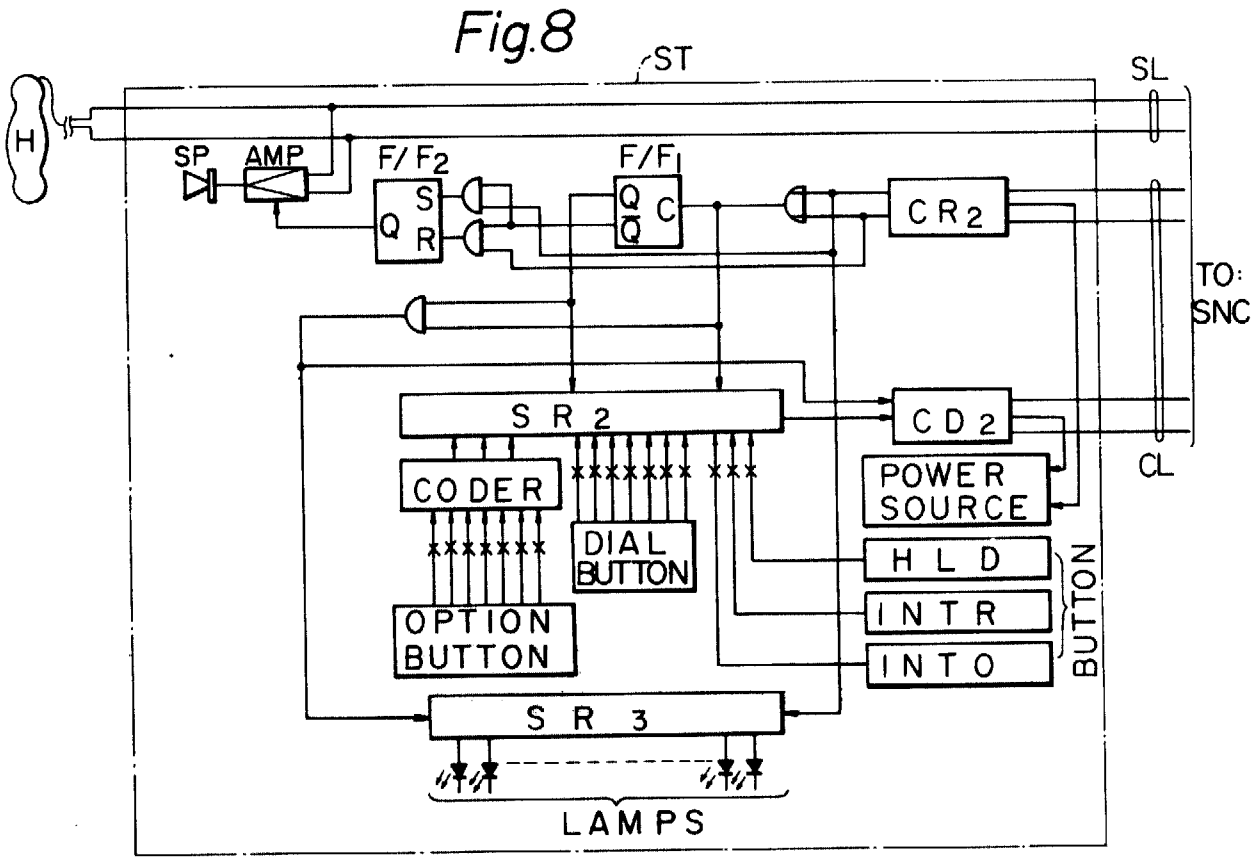
FIG. 8 is a block diagram of a key telephone station according to the present invention.

FIG. 12 is a block diagram showing a modified key telephone station of FIG. 8 which includes a part of the data exchange device. The symbols $LCR_2$, $CD_2$, $SR_2$, $SR_3$, F/F1, F/F2, AMP and SP of FIG. 12, represent the same means as those of the same symbols of FIG. 8. A counter CAN counts the time-slots and a symbol COR which represents the portion surrounded by the chain line in FIG. 12, is an or-circuit which separates the data in the first time-slot from the data in the second time-slot, wherein the counter CAN and the or-circuit COR constitute a data isolator.

The data from the common controller CC (FIGS. 6 and 10) and the central data processing unit CPU (FIG. 10) are transmitted through the switching network circuit SNC (FIG. 11) and are applied to the data receiver circuit $CR_2$ of the key telephone station ST (FIG. 12). The counter CAN (FIG. 12) detects whether the data received by the data receiver circuit $CR_2$ (FIG. 12) belong to the first time-slot or the second time-slot. The data belonging to the first time-slot are applied to the shift register $SR_3$ (FIG. 12) and the contents of the received data are displayed by a suitable lamp L (FIG. 12). The data belonging to the second time-slot are delivered to a data terminal equipment TMA (FIG. 13) through information lines $U_0$ and $U_1$ (FIGS. 12 and 13).

The push-button dial signal information or similar information is stored in the shift register $SR_2$ (FIG. 12). This push-button dial signal information or similar information is sent to the subscriber common equipment CE (FIGS. 2 and 10) by the data driver circuit $CD_2$ during the first time-slot. The data from the data terminal equipment TAM (FIG. 13) are applied to the key telephone station ST through the information lines $U_2$ and $U_3$ (FIGS. 12 and 13), which data are then sent to the subscriber common equipment CE (FIGS. 2 and 10) during the second time-slot.

Figure 13:
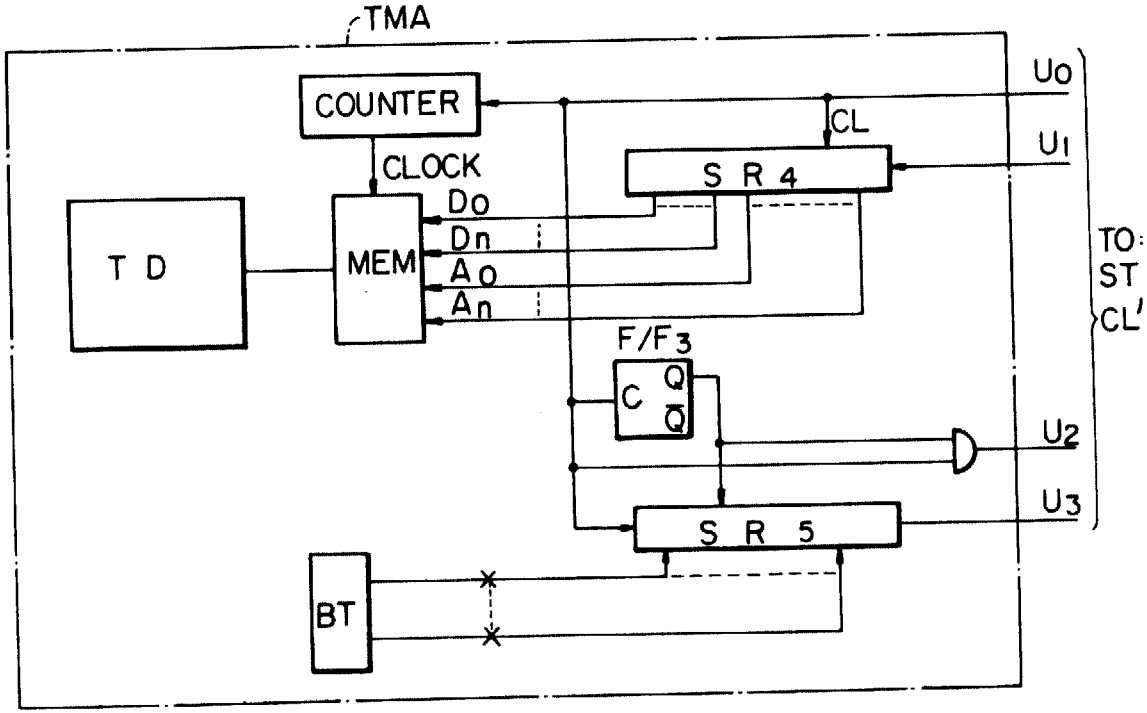
FIG. 13 is a block diagram of a data terminal equipment according to the present invention.

FIG. 13 is a block diagram of a data terminal equipment according to the present invention. In FIG. 13, the data which is delivered through the information line $U_1$ (FIGS. 12 and 13), are applied to the shift register $SR_4$ (FIG. 13) in synchronization with clock pulses. The clock pulses are separated from the aforesaid data and applied to the clock terminal CL (FIG. 13) of the shift register $SR_4$ through the information line $U_0$. The data stored in the shift register $SR_4$, are comprised of data information to be stored in a memory MEM through the lines $D_0$ . . . Dn (FIG. 13) and address information with which said data information is stored in the memory MEM. The address information is delivered through the lines $A_0$ . . . An (FIG. 13). The data information thus stored in the memory MEM is displayed on a terminal display TD (FIG. 13).

The data provided by the data terminal equipment TMA, are applied to a shift register $SR_5$ (FIG. 13) by pushing appropriate buttons BT (FIG. 13). The data which are provided by pushing the buttons BT, are stored in parallel to the shift register $SR_5$ by the first clock pulse of said clock pulses provided through the information line $U_0$ and a flip-flop F/F3. Then synchronized with the second and after clock pulses of said clock pulses the data are shifted in the shift register $SR_5$. Accordingly, the output of the flip-flop F/F3, controls the data so as to store it in parallel to the shift register $SR_5$, to shift the data in series in the register $SR_5$ and send it out therefrom. Thus, the data from the data terminal equipment TMA are sent to the subscriber common equipment CE (FIGS. 2 and 10) through a information line $U_3$ (FIG. 13). An information line $U_2$ delivers clock pulses of the data stored in the shift register SR5.

The data isolator COR shown in FIG. 12 can be mounted in the data terminal equipment TMA (FIG. 13). Further, the data isolator CIR shown in FIG. 11 can be mounted in the key telephone station ST or the data terminal equipment TMA.

As is apparent from the foregoing disclosure, according to the present invention, since the selection of a line circuit is performed by push-button dialing, the number of function buttons is reduced and the size of the key telephone station is made smaller while simplifying the operations for various services. Moreover, since a PB oscillator is disposed within a common controller CC, the conventional PB receiver can be eliminated from a key telephone system. Certain modifications, such as a change of telephone number, a change of station data and an addition of service function, can be accomplished by modifying the common controller CC alone, and the number of connecting wires between the subscriber common equipment CE and each key telephone station is reduced to a few wires, whereby installation and maintenance can be greatly simplified.

Furthermore, it becomes possible to provide a wide variety of data services at a low cost by using a number of divided time slots on the data line and by providing data terminal equipment to be served by such divided time slots.

The control of the common controller CC is not restricted to the stored program type, but the wired logic type control can be used in the common control CC. When the data transmission system according to the present invention is to be applied to a private automatic branch exchange (PABX), the central controller of the PABX may also be used for controlling the common controller of the data transmission system, so as to simplify the common controller CC.

What is claimed is:

1. A key telephone system for subscribers comprising: a *plurality of* key telephone [station] *stations* (ST) *each* having indication lamps (for example, LP, PLP, OPBL) which indicate the status of [the] *each* key telephone station, and a plurality of function buttons (for example, OPB, PB, HLD, INTR, INTO): a subscriber common equipment (CE) which is comprised of a plurality of connecting network circuits (for example, $CNW_0$, $CNW_1$ . . . CNWn), line circuits (LC), intra-office circuits (IC) and a common controller (CC) which controls said connecting network [cicuits,] *circuits*, line circuits and intra-office circuits, where said connecting network circuits connect a speech line (SL) of one key telephone station and a speech line (SL) of the other key telephone station by using a register connecting circuit (RGC) and switching network circuits (for example, $SNC_0$, $SNC_1$ . . . SNCn), each of which switching network circuits cooperates with both line circuit links (for example, $LCL_0$, $LCL_1$ . . . LCLn) and intra-office circuit links (for example, $ICL_0$, $ICL_1$ . . . ICLn); and control lines (CL) which connect each of said key telephone stations and said subscriber common equipment, wherein a desired one of said line circuit links is caught [by dialing a desired line circuit number by push button means (PB) of said common controller] *by means of said common controller when dialing a desired line circuit number by using push buttons (PB),* which desired line circuit number is indicated on said indication lamp (LP), while the desired one of said intra-office circuit links is caught by pushing a desired intra-office button (for example, INTR. INTRO), by means of said common controller.

2. A key telephone system for subscribers as set forth in claim 1, further including: [a] data terminal [equipment] *equipments* (TAM) located on said key telephone station side; a [first] data separator (CAN) and a [second] data separator (COR) [which are inserted in] *for connecting both said key telephone station (ST) and said data terminal equipment (TAM) with each other by way* data control lines (CL') [between said key telephone station]; and *a data separator (CIR) for connecting both* said common controller (CC)[; a third data separator (CIR) which is inserted in] *and a central data processing unit (CPU) with each other by way of* data control lines (CL'') [between said common controller and a central data processing unit (CPU)]; wherein data relating to said key telephone station are transmitted through said control lines (CL) during a first time-slot by way of said [first, second and third data isolators] *data separators (CAN), (COR) and (CIR),* and data relating to said data terminal equipment are transmitted through both said control lines (CL) and said data control lines (CL', CL'') during a second time-slot by means of said [first, second and third data isolators] *data separators (CAN), (COR) and (CIR),* and data relating to said data terminal equipment are transmitted through both said control lines (CL) and said data control lines (CL', CL'') during a second time-slot by means of said [first, second and third data isolators] *data separators (CAN), (COR) and (CIR),* whereby data transmission is effected between one of said data terminal equipments and [the other] *another* of said data terminal equipments and between one of said data terminal equipments and said central data processing unit during said second time-slot.

* * * * *